United States Patent
Nau et al.

(10) Patent No.: US 6,913,676 B2
(45) Date of Patent: Jul. 5, 2005

(54) DEVICE FOR SUPPLYING AT LEAST TWO LIQUID MEDIA TO CONSUMERS OF A FUEL CELL SYSTEM

(75) Inventors: Michael Nau, Dornhan/Aischfeld (DE); Manfred Ruoff, Moeglingen (DE); Marc Bareis, Markgroeningen (DE); Frank Ilgner, Karlsruhe (DE); Horst Harndorf, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 10/181,478

(22) PCT Filed: Jan. 17, 2001

(86) PCT No.: PCT/DE01/00165
§ 371 (c)(1),
(2), (4) Date: Oct. 28, 2002

(87) PCT Pub. No.: WO01/54214
PCT Pub. Date: Jul. 26, 2001

(65) Prior Publication Data
US 2003/0124404 A1 Jul. 3, 2003

(30) Foreign Application Priority Data
Jan. 19, 2000 (DE) .......................... 100 02 003

(51) Int. Cl.$^7$ .......................... C25B 9/00; C25D 17/00
(52) U.S. Cl. .............. 204/279; 204/265; 204/266; 204/270; 204/278; 429/12
(58) Field of Search .......................... 204/265, 266, 204/270, 277, 278, 276; 429/12

(56) References Cited

U.S. PATENT DOCUMENTS

| | | | | | |
|---|---|---|---|---|---|
| 3,468,713 | A | * | 9/1969 | Mueller | 429/14 |
| 3,505,119 | A | * | 4/1970 | Gillespie | 429/25 |
| 3,969,214 | A | * | 7/1976 | Harris | 204/241 |
| 3,981,745 | A | * | 9/1976 | Stedman | 204/266 |

FOREIGN PATENT DOCUMENTS

| | | |
|---|---|---|
| DE | 197 28 800 C | 2/1999 |
| GB | 481 270 A | 3/1938 |

* cited by examiner

Primary Examiner—Donald R. Valentine
(74) Attorney, Agent, or Firm—Ronald E. Greigg (57) ABSTRACT

An apparatus for delivering at least two liquid media to consumers of a fuel cell system, with a feed pump is made less complicated than known apparatuses in that at least one pressure transmission unit between the at least two media is provided with at least one pressure transmission element, which has at least two pressure faces for pressure imposition that communicate with the liquid media.

20 Claims, 5 Drawing Sheets

DEVICE FOR SUPPLYING AT LEAST TWO LIQUID MEDIA TO CONSUMERS OF A FUEL CELL SYSTEM

CROSS-REFERENCE TO RELATED APPLICATIONS

This application is a 35 USC 371 application of POT/DE 01/00165 filed on Jan. 17, 2001.

BACKGROUND OF THE INVENTION

1. Field of the Invention

The invention relates to an apparatus for delivering at least two liquid media to consumers of a fuel cell system.

2. Prior Art

Especially in conjunction with future drive concepts for vehicles, fuel cell technology is gaining evermore importance. Fuel cells offer the capability of converting chemically bound energy directly into electrical energy, which is then converted with the aid of an electric motor into mechanical drive energy. In contrast to heat engines, the efficiency of a fuel cell is not limited by Carnot's theorem. Currently preferred fuel cells use hydrogen and oxygen and convert these elements into water, an environmentally friendly end product.

Because of the technical problems in storing hydrogen in vehicles, a shift has been made to generating the hydrogen as needed, by so-called reforming or partial oxidation of hydrocarbons. Such hydrocarbons are present in the form of conventional fuels, such as gasoline or Diesel fuel, but other hydrocarbons, such as methane or methanol, can also be used for the purpose.

In conjunction with a fuel cell drive, the corresponding apparatus for chemical conversion, that is, the reformation of the motor fuels into hydrogen, must meet special demands compared to previous chemical systems.

Such an arrangement must do justice to a considerable load spread, that is, major difference in the volumetric flow hydrogen required, and correspondingly also the media required to generate the hydrogen; a corresponding dynamic behavior must be assured, to generate the desired fluctuations in the volumetric flow of the media within the briefest possible time. Moreover, such an arrangement must offer good cold-starting performance and good operating reliability. Other demands in terms of economy dictate a low weight in conjunction with a small volume and in particular low production costs.

For fuel cell systems of the type described, on the one hand different media must be delivered, for instance water and fuel as well as air. On the other, one and the same medium, such as fuel, must be delivered to different components of the system. Depending on the design of the fuel cell system, a burner for generating reaction heat for converting the fuel, for instance, and the so-called reformer in which the fuel is converted, or an evaporator possibly disposed upstream, must all be supplied with the same fuel.

Also as a rule, various components must be supplied with water, such as once again the reformer for converting the fuel, which for that purpose can again optionally be preceded by an evaporator, and for instance a unit downstream of the reformer, for performing a so-called "shift reaction", in which residual quantities of CO resulting from the reaction in the reformer are oxidized with the addition of water to make $CO_2$, once again releasing hydrogen.

For operating a fuel cell system, superpure water is needed. Such water is distinguished by its poor lubricant properties and its high corrosivity, which makes extreme demands especially of the pumps required for pumping and compression. This increases the engineering effort and thus also the costs for corresponding systems.

Until now, for each quantitative flow to be set up in such fuel cell systems, separate metering systems including separate differential pressure regulators have been used, for instance one each for methanol and water, by means of which the respectively required quantity of the particular medium is delivered. A simplification of such fuel cell systems is achieved solely by using a common pump motor. Such fuel cell systems are very complex and correspondingly expensive.

SUMMARY OF THE INVENTION

By comparison, the object of the invention is to propose an apparatus for delivering at least two liquid media for a fuel cell system that meets the demands listed above and enables economical manufacture.

Accordingly, an apparatus according to the invention is distinguished in that at least one pressure transmission unit is provided between the various at least two media, having at least one transmission element which has at least two pressure faces for pressure imposition that communicate with the liquid media. A pressure potential for a medium, for instance for the fuel medium, in particular gasoline or Diesel fuel, is generated and transmitted to a different medium, which possibly places extreme demands of the pumps required for pumping and compression, as in the case for instance with superpure water.

Components for pumping and compressing gasoline or Diesel fuel, for instance, are available on the market in the form of units for motor vehicle injection systems. For furnishing the pressure potentials required within the fuel cell system, it is therefore possible to use solely standard components. By the omission of additional expensive pumps for compressing a medium, such as highly corrosive superpure water, and the simple interconnection of economical standard components, a fuel cell system can accordingly be achieved with less complication and consequently less expense.

In an advantageous refinement of the invention, the transmission element is embodied as at least partly movable and/or at least partly expandable, so that particularly if the volumes of the applicable media change, for instance from their consumption within the fuel cell system, the pressure potential transmission is effected in a simple way.

Advantageously, the transmission element is embodied as a partition between two pressure chambers, so that a compact transmission unit can be made.

In a special refinement of the invention, the transmission element includes a piston, bellows, and/or diaphragm. With these transmission elements, a comparatively simple pressure transmission is possible.

Advantageously, the pressure transmission unit has at least two pressure chambers for the liquid media, which communicate with one another through the transmission element. In principle, these pressure chambers can be embodied by separate containers. In an especially advantageous embodiment, however, a pressure vessel is provided which includes both pressure chambers and is embodied for instance as a hollow cylinder, making the production of the pressure transmission unit simpler and moreover resulting in an especially compact structure.

In an advantageous refinement of the invention, a pressure boost is provided by means of different-sized pressure faces of the transmission element, so that advantageously the furnishing of the one medium, such as the superpure water, is effected at a different pressure level from the pressure potential of the other medium, such as the fuel medium. For instance, often not such high demands are made in terms of the atomization quality of the superpure water as are made of fuel. With the embodiment just mentioned, the pressure level of the superpure water can for instance be adapted to the appropriate demands.

In an especially advantageous embodiment, the pressure transmission unit includes an arrangement which transmits the pressure from one pressure chamber to two or more pressure chambers. The pressure potential of at least one medium can advantageously be transmitted to a further medium having at least two different pressure potentials, or to at least two further, different media with the same or different pressure potentials.

By means of the first embodiment just mentioned, an especially simple adaptation to different pressure levels of different consumers within the fuel cell system can for instance be achieved, achieving a marked reduction in engineering effort and thus in expense.

With the aid of the latter embodiment just mentioned, possible additional media can for instance be subjected to pressure inside the fuel cell system without major effort. Consequently, for possibly more-complex fuel cell systems, a further marked reduction in both engineering effort and expense is achieved.

In an advantageous refinement of the invention, at least one control valve for one medium is provided, in order to switch a connecting line of one pressure chamber between the compression side and the suction side of one or more pumps. Thus a clocked pressure imposition on the pressure transmission unit can be achieved in an advantageous way.

Advantageously, at least one control valve for a medium is provided, in order to switch the connecting line of one pressure chamber between a media metering device and a media supply. In this advantageous refinement of the invention, a second medium can be withdrawn from the supply in clocked operation and delivered to the media metering device.

In a technologically advantageous refinement of the invention, two or more pressure transmission units are clocked in phase-offset fashion, so that uninterrupted, permanent metering of the media is achieved.

Upon a switchover of the aforementioned control valves, in a particular embodiment, a pressure drop can be avoided, by additionally inserting an appropriate pressure reservoir into the arrangement between the control valve and the metering device.

If for instance the two or more transmission units, clocked in phase-offset fashion, are disposed in the common pressure vessel, an especially advantageous simplification of the arrangement is achieved. An enormous reduction is achieved in both the engineering effort, because of the especially compact design, and in the costs for corresponding fuel cell systems.

In especially advantageous embodiments, two or more pressure transmission units are provided, and these are disposed in one or more pressure vessels, so that depending on the interconnection or arrangement of corresponding control valves, for instance when there are two media to be taken into account, an operating mode of the fuel cell system is obtained in which the media can be delivered to different consumers independently of one another; for instance, the second medium can be provided with different pressure potentials by different pressure transmission units and delivered to corresponding different consumers.

Moreover, in an advantageous embodiment with two or more pressure transmission units, various media can be subjected to pressure independently of one another and/or dependent on one another; for instance, one medium can transmit its pressure potential to one or more further media. Especially complex and/or flexible fuel cell systems can thus be realized at little effort and consequently economically.

BRIEF DESCRIPTION OF THE DRAWINGS

The invention is described in further detail below in conjunction with the drawings, in which.

DESCRIPTION OF THE PREFERRED EMBODIMENTS

Figure 1:
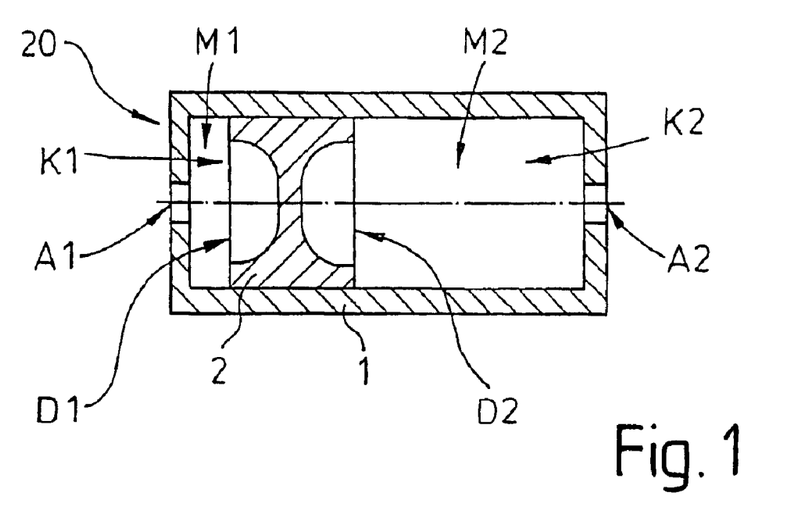
FIG. 1 shows a first exemplary embodiment, with a movable piston as the transmission element.

In FIG. 1, a pressure transmission unit 20 for two media M1, M2 is shown, which includes a cylinder 1 and a movable piston 2 having the two pressure faces D1, D2 and two pressure chambers K1, K2. The media M1, M2 are supplied and removed via the connections A1, A2 of the pressure transmission unit 20. An especially compact design of the pressure transmission unit 20 is thus achieved; in this embodiment, because of the equal-sized pressure faces D1, D2, the pressure transmitted to the medium M2 is equivalent to the pressure of the medium M1.

Figure 2:
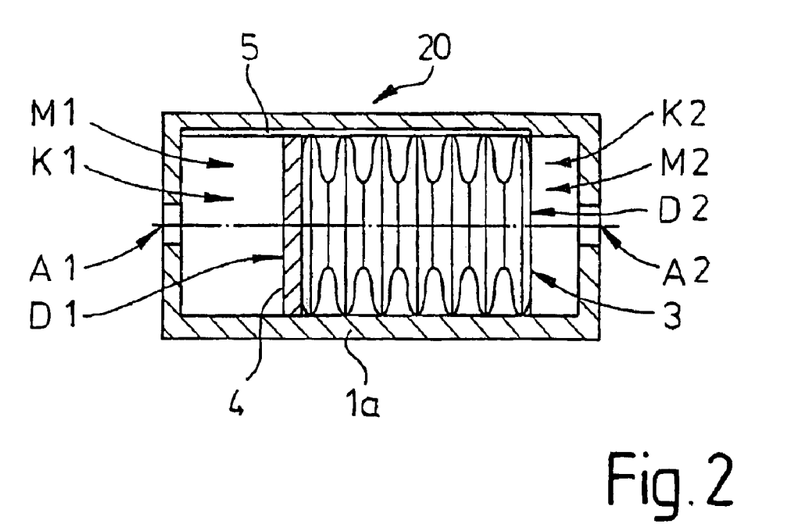
FIG. 2 shows a second exemplary embodiment, with a movable bellows as the transmission element.

In FIG. 2, a pressure transmission unit for two media M1, M2 is shown, which includes a cylinder 1a and a movable bellows 3 with a plate 4 and two pressure chambers K1, K2. Upon a change in position of the plate 4, the groove 5 prevents the inclusion of the medium M1 in the outer interstices in the bellows 3, since via the groove 5, the outer interstices of the bellows 3 always communicate with the pressure chamber K1. The media M1, M2 are delivered and removed via the connections A1, A2 of the pressure transmission unit 20.

Figure 3:
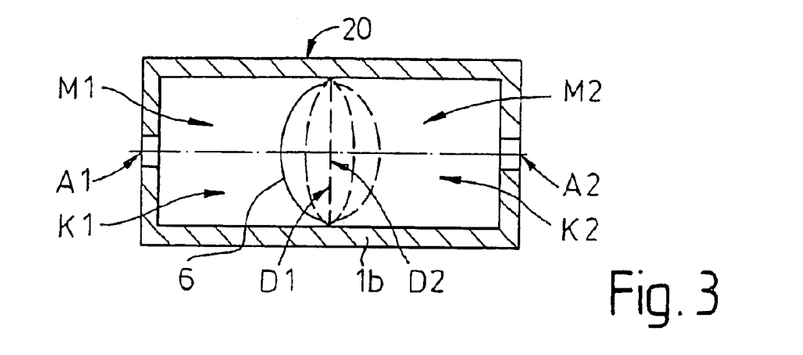
FIG. 3 shows a third exemplary embodiment, with a movable expandable diaphragm as the transmission element.

In FIG. 3, a pressure transmission unit for two media M1, M2 is shown, which includes a cylinder 1b, an expandable diaphragm 6, and two pressure chambers K1, K2. The dashed lines in FIG. 3 represent various positions of the diaphgram 6 at different volumetric ratios between the two pressure chambers K1, K2. The media M1, M2 are delivered and removed via the connections A1, A2 of the pressure transmission unit 20.

Figure 4:
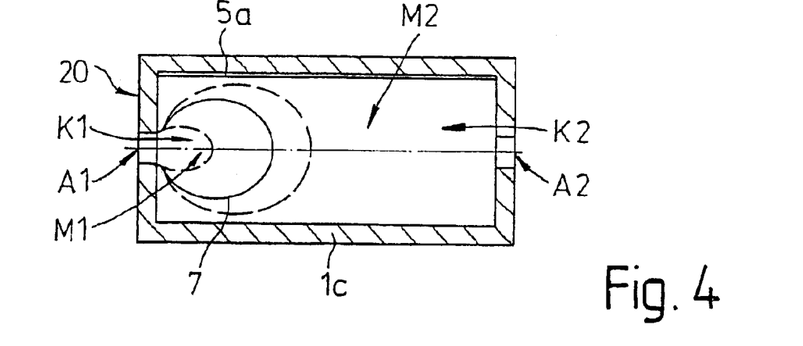
FIG. 4 shows a fourth exemplary embodiment, with a movable piston as the transmission element.

In FIG. 4, a pressure transmission unit for two media M1, M2 is shown, which includes a cylinder 1c, an expandable balloon 7, and two pressure chambers K1, K2. The groove 5a serves, when the balloon 7 upon an increase in the volume of the media M1 possibly divides the pressure chamber K2 into two partial chambers, to connect these partial chambers to one another. The dashed lines in FIG. 4 represent various locations of the balloon for various volumes. The media M1, M2 are delivered and removed via the connections A1, A2 of the pressure transmission unit 20.

Figure 5:
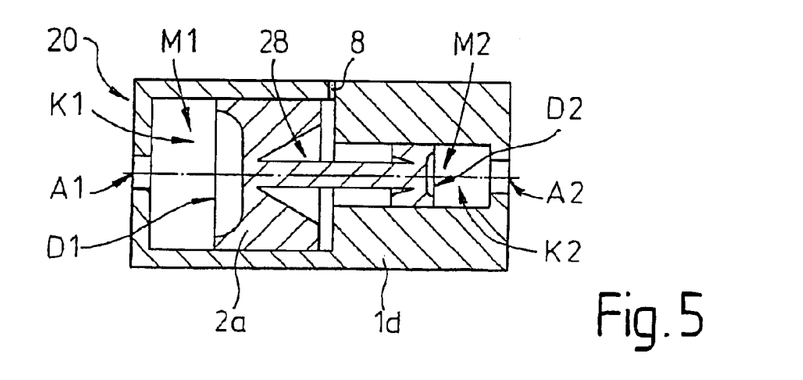
FIG. 5 shows a fifth exemplary embodiment, with a movable piston for pressure boosting as the transmission element.

In FIG. 5, a pressure transmission unit with pressure boost for two media M1, M2 is shown, which includes a cylinder 1d and a movable piston 2a with two different-sized pressure faces D1, D2. Upon a change in position of the piston 2a, the volume of the inner chamber 28 is changed. The vent 8 here allows an equalization of the pressure of the inner chamber 28 with the ambient pressure. The media M1, M2 are delivered and removed via the connections A1, A2 of the pressure transmission unit 20.

Figure 6:
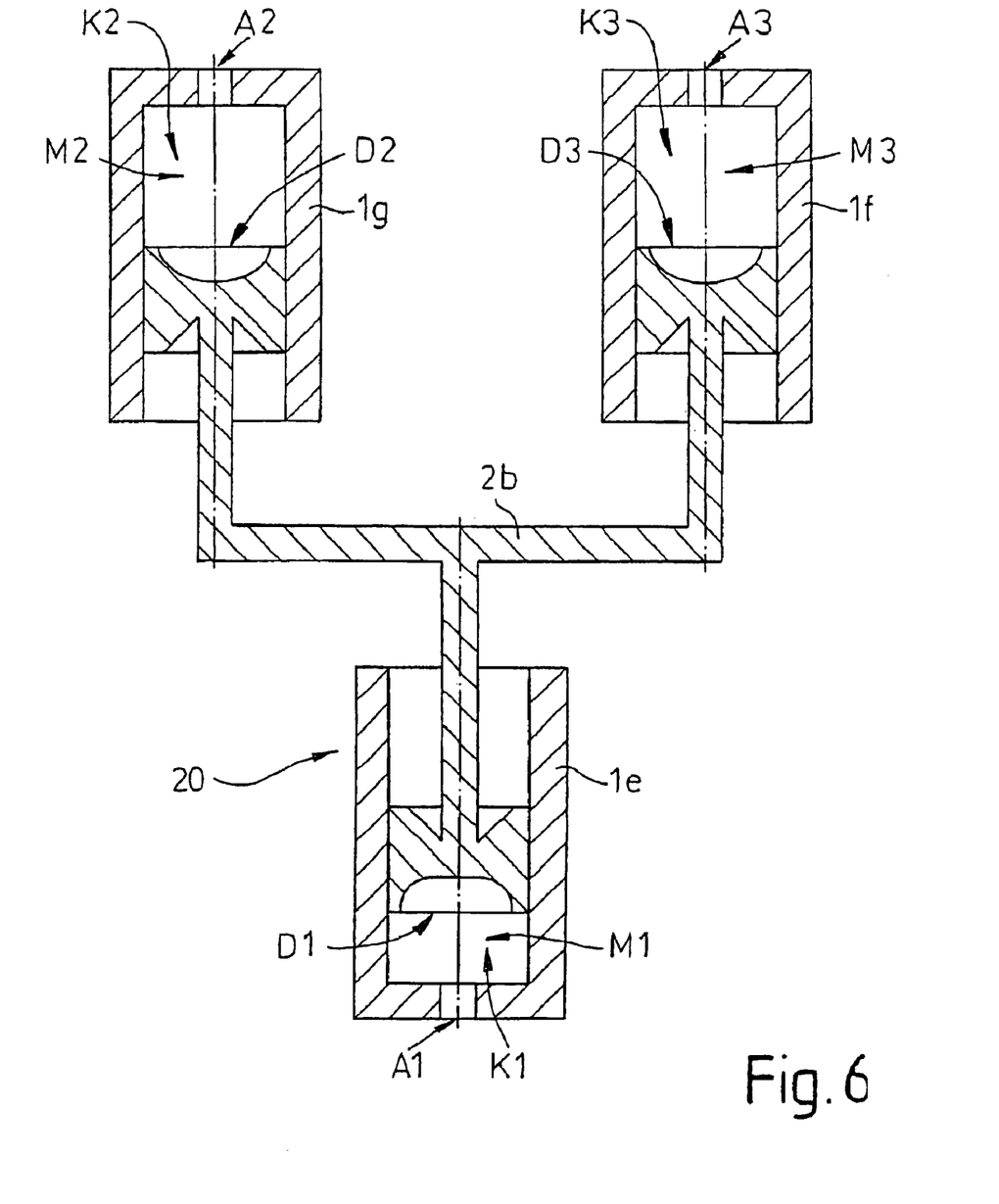
FIG. 6, a sixth exemplary embodiment of a pressure transmission unit, with a movable piston for three different media.

In FIG. 6, a pressure transmission unit for three media M1, M2, M3 is shown, which includes three cylinders 1e, f, g and three movable pistons 2b rigidly joined to one another. The media M1, M2, M3 are delivered and removed via the connections A1, A2, A3 of the pressure transmission unit 20. With this embodiment, it is possible, for instance beginning at one medium M1, for two different media M2, M3 to be subjected to pressure according to the invention. Moreover, two materially identical media M2, M3, for instance, can be acted upon by different pressure potentials according to the invention, given different-sized pressure faces D2, D3.

Figure 7:
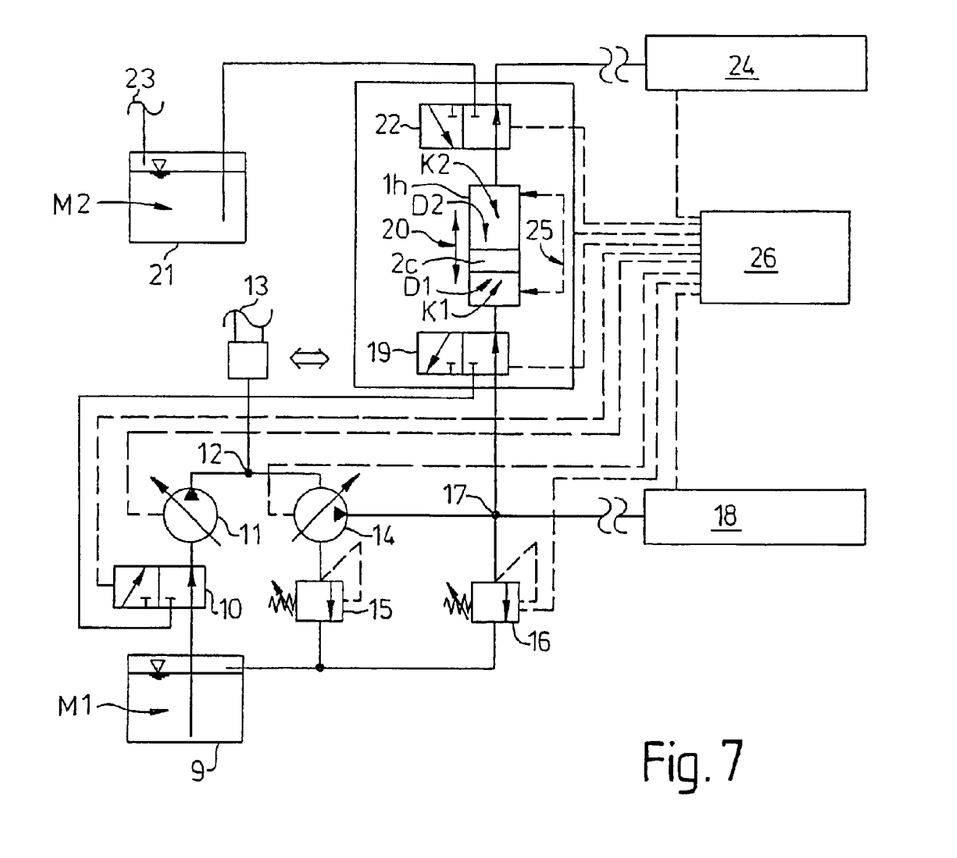
FIG. 7, a flowchart of an exemplary embodiment of the invention with a pressure transmission unit.

In the flowchart of FIG. 7, dashed lines represent control lines, while solid lines represent media lines. The medium M1 is carried out of the supply tank 9 to the filling pump 11 via a valve 10. In terms of the pumping direction downstream of the filling pump 11, the branching point 12 is disposed such that the medium M1 having the filling pressure potential is available on the one hand at the point 13 for any low-pressure consumers that there may be. On the other, with the filling pump 11, the requisite pilot pressure of the high-pressure pump 14 is generated, the pilot pressure being set via the control valve 15. Excess medium M1 returns to the supply tank 9 via a bypass. The setting of the high pressure is accordingly done via the control valve 16, and once again excess medium M1 returns to the supply tank 9 via a bypass.

With the aid of the branching point 17, the medium M1 on the one hand is advantageously carried to the metering device 18, and on the other is carried to the pressure transmission unit 20 via the control valve 19.

In the exemplary embodiment shown, the pressure is transmitted to the medium M2 by means of the cylinder 1h and the movable piston 2c. In a push-pull mode, the medium M2 is delivered from the supply tank 21 to the pressure transmission unit 20 via the control valve 22. The supply tank 21 also has a return 23 from the fuel cell system.

The inflow of the medium M2 to the consumers of the fuel cell system is finally effected from the pressure transmission unit 20 to the metering device 24 via the control valve 22.

In an advantageous version, the medium M1 can be made available at the fill pressure potential to arbitrary consumers of the fuel cell system via the point 13, for instance. Moreover, for instance at the point 13, a second pressure transmission unit for the fill pressure potential can be provided, so that the medium M2 or a further medium can be subjected to the fill pressure potential; the connection of the medium M2 or a further medium for this version is not shown.

In a further advantageous technical embodiment, if high pressure is not needed inside the fuel cell system, the high-pressure pump 14 and the control valve 16 with the associated bypass can be omitted. This achieves a further simplification of the apparatus according to the invention, but this is not shown in the drawing.

The mode of operation of the embodiment shown will now be described in further detail.

If the medium M2 is required in the fuel cell system, then the piston 2c is displaced in the direction of the control valve 22. The withdrawn volume of the medium M2 is replaced on the side of the medium M1 via the high-pressure pump 14, by displacement of the piston 2c.

Advantageously, the position or speed of the piston 2c can be detected via a sensor 25, such as an inductive pickup, and carried on to the controller 26 for determining the volumetric flow of the medium M2. In this way, it is simple to find out how much medium M2 is still available in the cylinder 1h. This is of decisive importance for the further mode of operation of the apparatus of the invention; see below.

The position of the piston 2c can be determined, in a further version, with the aid of a performance graph stored in memory in the controller 26; the displacement of the piston 2c is ascertained via the piston face D2 and the integration of the flow rate over time, but the ascertaining of the flow rate is not shown in the drawing. Advantageously, given an already existing measurement of the flow rate of the medium M2 within the fuel cell system, the determination of the piston position and thus of the supply of medium M2 in the cylinder 1h can advantageously be achieved without additional components.

If the supply of medium M2 in the cylinder 1h is used up, then the control valves 10, 19 and 22 are switched via the controller 26. The filling pump 11 aspirates the fuel from the cylinder 1h; the piston 2c moves in the direction of the control valve 19, causing the cylinder 1h to be filled with the medium M2 again from the supply tank 21. The filling of the supply tank 21 can be done for instance via a suitable medium loop in the fuel cell system.

Once a sufficient quantity of the medium M2 is again present in the cylinder 1h, the control valves 10, 19 and 22 are switched again, so that the metering device 24 again makes the medium M2 available under pressure.

The embodiment described does not enable standard metering of the medium M2, since the cylinder 1 h has to be refilled after running empty. This filling operation can admittedly be shortened by increasing the pumping capacity of the filling pump 11, but a certain amount of time still remains within which metering of the medium M2 by metering device 24 is not possible. For applications in which the medium M2 must be metered only during certain operating states, this version is sufficient, for instance as in cold starting or upon a load change.

Figure 8:
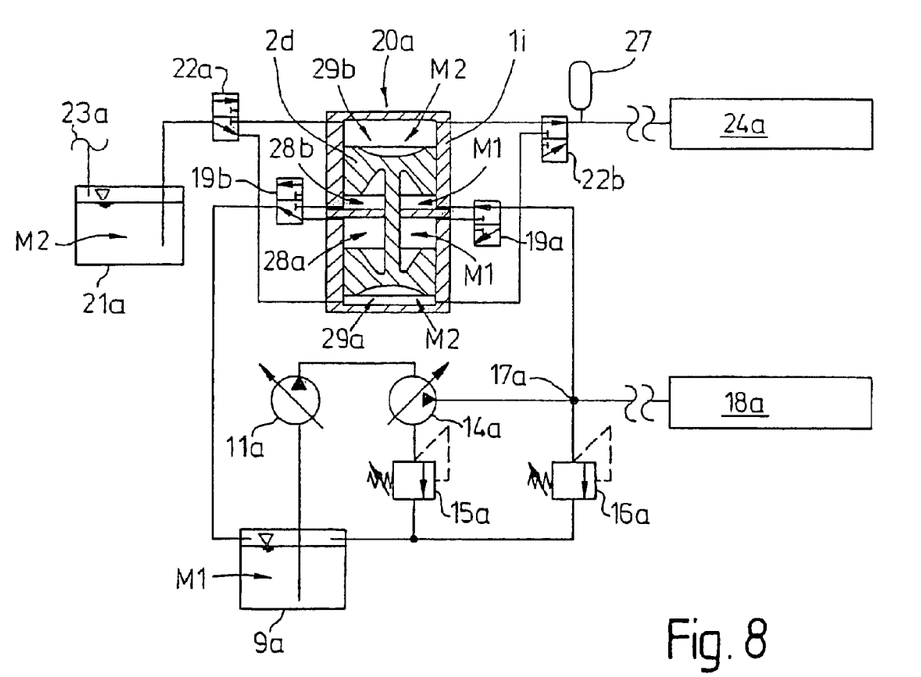
FIG. 8, a flowchart of an exemplary embodiment of the invention with two pressure transmission units clocked in phase-offset fashion.

In FIG. 8, an especially advantageous version is shown with which permanent metering of the medium M2 is achieved. The mode of operation of the version shown in FIG. 7, for instance of the controller, pressure generation or pressure boost, applies to FIG. 8 as appropriate.

In the exemplary embodiment of FIG. 8, an especially simple version of two cylinder chambers clocked in phase-offset fashion is employed. One corresponding cylinder 1i with a double piston 2d is used here. For filling the cylinder 1i with the medium M1, a control valve 19a is used. For returning the medium M1 to the supply tank 9a, a control valve 19b is used.

Correspondingly, for filling the cylinder 1i with the medium M2, a control valve 22a is used, and a control valve 22b is used for delivering the medium M2 to the metering device 24a. Between the control valve 22b and the metering device 24a, a pressure reservoir 27 is inserted, which prevents a pressure drop upon switchover of the control valves.

The mode of operation of the embodiment shown in FIG. 8 will be described in detail below.

In the advantageous version of the cylinder 1i as a multichamber cylinder with a movable piston 2d that is advantageously embodied as a movable double piston, a constant supply of pressurized medium M2 to the fuel cell system is assured.

The medium M1 is pumped by the high-pressure pump 14 or the filling pump 11 into the two inner chambers 28a, b in alternation, and the pressure potential of the medium M1 is transmitted to the medium M2 via the piston into the two outer chambers 29a, b.

During the withdrawal of the medium M1 via the metering device 24a, the piston 2d is displaced. The medium M1 located in the inner chamber 28a is pumped back into the supply tank 9a, and the outer chamber 29a is filled with medium M2 from the supply tank 21a. Switching of the valves causes the direction of motion of the piston 2d to be reversed. The medium M2 is now drawn from the outer chamber 29a, while the inner chamber 28a is filled with the medium M1; the inner chamber 28b is evacuated into the supply tank 9a, and the outer chamber 29a is filled with medium M2 from the supply tank 21a. Pressure drops upstream of the metering system are avoided by means of pressure reservoir 27.

A further embodiment, which assures a constant supply of pressurized medium M2 to the fuel cell system, is also achieved with two separate cylinders 1 and corresponding interconnection among various control valves, but this will not be described or shown in further detail here.

For apparatuses according to the invention, all combinations of the embodiments shown in the drawings are possible. In all the combinations, the flow rates of the medium M1 that flows via the bypasses into the supply tank 9 are advantageously kept as slight as possible by adapting the pump rpm to the substance flow rates, thus minimizing losses resulting from an excessively high pumping capacity and averting disadvantageous heating of the supply tank 9, which especially in fuel cell systems must be avoided.

Also in an advantageous embodiment, by measuring the piston speed, for instance via an inductive pickup, a simple determination of the metered quantity of the medium M2 is achieved. Advantageously, the measurement of the volume is utilized in the metering for regulating the flow rate.

LIST OF REFERENCE NUMERALS:

1 Cylinder
2 Piston
3 Bellows
4 Plate
5 Groove
6 Diaphragm
7 Balloon
8 Vent
9 Supply tank
10 Control valve
11 Filling pump
12 Branching point
13 Point
14 High-pressure pump
15 Control valve
16 Control valve
17 Branching point
18 Metering device
19 Control valve
20 Pressure transmission unit
21 Supply tank
22 Control valve
23 Return
24 Metering device
25 Sensor
26 Controller
27 Pressure reservoir
28 Inner chamber
29 Outer chamber
A1 Connection
A2 Connection
A3 Connection
D1 Pressure face
D2 Pressure face
D3 Pressure face
K1 Chamber
K2 Chamber
K3 Chamber
M1 Medium
M2 Medium
M3 Medium

What is claimed is:

1. An apparatus for delivering at least two liquid media (M1, M2) to consumers of a fuel cell system, such as the fuel cell itself, fuel conversion units, or the like, comprising
   a feed pump (11) for pumping one of the media (M1),
   at least one pressure transmission unit (20) between the various at least two media (M1, M2),
   the pressure transmission unit (20) being a separate unit from the feed pump (11) and having at least one pressure transmission element (2), with two pressure faces (D1, D2) for pressure imposition that communicate with the liquid media (M1, M2).

2. The apparatus of claim 1, wherein the pressure transmission element (2) is embodied as at least partly movable and/or at least partly expandable.

3. The apparatus of claim 2, wherein the pressure transmission element (2) is embodied as a partition between two pressure chambers (K1, K2).

4. The apparatus of claim 2, wherein the pressure transmission unit (2) has at least two pressure chambers (K1, K2) for the liquid media (M1, M2), which communicate with one another through the pressure transmission element (2).

5. The apparatus of claim 2, wherein a pressure vessel (1) is provided, which includes the two pressure chambers (K1, K2).

6. The apparatus of claim 2, further comprising different-sized pressure faces (D1, D2) of the pressure transmission element (2) to thereby provide a pressure boost.

7. The apparatus of claim 1, wherein the pressure transmission element (2) is embodied as a partition between two pressure chambers (K1, K2).

8. The apparatus of claim 7, wherein the pressure transmission element (2) includes a piston (2), bellows (3), and/or diaphragm (6).

9. The apparatus of claim 1, wherein the pressure transmission element (2) includes a piston (2), bellows (3), and/or diaphragm (6).

10. The apparatus of claim 1, wherein the pressure transmission unit (2) has at least two pressure chambers (K1, K2) for the liquid media (M1, M2), which communicate with one another through the pressure transmission element (2).

11. The apparatus of claim 1, wherein a pressure vessel (1) is provided, which includes the two pressure chambers (K1, K2).

12. The apparatus of claim 1, further comprising different-sized pressure faces (D1, D2) of the pressure transmission element (2) to thereby provide a pressure boost.

13. A vehicle including a fuel cell having an apparatus of claim 1.

14. An apparatus for delivering at least two liquid media (M1, M2) to consumers of a fuel cell system, such as the fuel cell itself, fuel conversion units or the like, comprising a feed pump (11) for pumping one of the media (M1), at least one pressure transmission unit (20) between the various at least two media (M1, M2), the pressure transmission unit (20) having at least one pressure transmission element (2) with two pressure faces (D1, D2) for pressure imposition that communicate with the liquid media (M1, M2), wherein the pressure transmission unit (20) includes an arrangement which transmits the pressure from one pressure chamber (K1) to two or more pressure chambers (K2, K3) for the same or different media (M2, M3).

15. An apparatus for delivering at least two liquid media (M1, M2) to consumers of a fuel cell system, such as the fuel cell itself, fuel conversion units or the like, comprising a feed pump (11) for pumping one of the media (M1), at least one pressure transmission unit (20) between the various at least two media (M1, M2), the pressure transmission unit (20) being a separate unit from the feed pump (11) and having at least one pressure transmission element (2), with two pressure faces (D1, D2) for pressure imposition that communicate with the liquid media (M1, M2), wherein at least one control valve (19) for one medium (M1) is provided, in order to switch a connecting line of one pressure chamber (K1) between the compression side and the suction side of one or more pumps (11, 14).

16. An apparatus for delivering at least two liquid media (M1, M2) to consumers of a fuel cell system, such as the fuel cell itself, fuel conversion units or the like, comprising a feed pump (11) for pumping one of the media (M1), at least one pressure transmission unit (20) between the various at least two media (M1, M2), the pressure transmission unit (20) having at least one pressure transmission element (2), with two pressure faces (D1, D2) for pressure imposition that communicate with the liquid media (M1, M2), further comprising at least one control valve (22) for a medium (M2), the control valve being operable to switch the connecting line of one pressure chamber (K2) between a media metering device (24) and a media supply (21).

17. An apparatus for delivering at least two liquid media (M1, M2) to consumers of a fuel cell system, such as the fuel cell itself, fuel conversion units or the like, comprising a feed pumping (11) for pumping one of the media (M1), at least one pressure transmission unit (20) between the various at least two media (M1, M2)

the pressure transmission unit (20) having at least one pressure transmission element (2), with two pressure faces (D1, D2) for pressure imposition that communicate with the liquid media (M1, M2), wherein two or more pressure transmission units (20) are provided.

18. The apparatus of claim 17, wherein said two or more pressure transmission units (20) are disposed in one pressure vessel (1).

19. The apparatus of claim 18, wherein said two or more pressure transmission units (20) are clocked in phase-offset fashion.

20. The apparatus of claim 17, wherein said two or more pressure transmission units (20) are clocked in phase-offset fashion.

* * * * *